(12) United States Patent
Iguchi et al.

(10) Patent No.: US 10,081,372 B2
(45) Date of Patent: Sep. 25, 2018

(54) INFORMATION PROCESSING APPARATUS AND INFORMATION PROCESSING METHOD

(71) Applicant: FUJITSU TEN LIMITED, Kobe-shi, Hyogo (JP)

(72) Inventors: Yusuke Iguchi, Kobe (JP); Kenta Nose, Kobe (JP); Taiki Kuwahara, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 15/380,107

(22) Filed: Dec. 15, 2016

(65) Prior Publication Data

US 2017/0217447 A1    Aug. 3, 2017

(30) Foreign Application Priority Data

Feb. 2, 2016    (JP) ................. 2016-018398

(51) Int. Cl.
*B60W 50/00*    (2006.01)
*B60W 50/14*    (2012.01)
*H04L 12/58*    (2006.01)
*H04M 3/436*    (2006.01)

(52) U.S. Cl.
CPC ............. *B60W 50/14* (2013.01); *H04L 51/12* (2013.01); *H04L 51/24* (2013.01); *H04M 3/436* (2013.01)

(58) Field of Classification Search
CPC ...... B60W 50/00; B60W 50/10; B60W 50/14; B60W 50/16; B60W 50/12
See application file for complete search history.

(56) References Cited

U.S. PATENT DOCUMENTS

| | | | |
|---|---|---|---|
| 2005/0216153 A1* | 9/2005 | Cho ..................... | G07C 5/0858 701/33.4 |
| 2007/0255464 A1* | 11/2007 | Singh ................... | B60R 25/102 701/36 |
| 2010/0055649 A1* | 3/2010 | Takahashi ........... | B60W 50/082 434/66 |
| 2014/0195113 A1* | 7/2014 | Lu ....................... | B60G 17/0165 701/37 |
| 2015/0112512 A1* | 4/2015 | Fan ...................... | H04L 67/12 701/2 |
| 2016/0171322 A1* | 6/2016 | Gunaratne ......... | G06K 9/00604 348/148 |
| 2017/0161967 A1* | 6/2017 | Matsuo ................ | G07C 5/008 |
| 2017/0289346 A1* | 10/2017 | Suzuki .............. | H04M 1/72577 |

FOREIGN PATENT DOCUMENTS

| | | |
|---|---|---|
| JP | H11-288296 A | 10/1999 |
| JP | 2004-070795 A | 3/2004 |
| JP | 2004-348657 A | 12/2004 |
| JP | 2016-014969 A | 1/2016 |

* cited by examiner

*Primary Examiner* — Yonel Beaulieu
(74) *Attorney, Agent, or Firm* — Oliff PLC

(57) ABSTRACT

An information processing apparatus according to an embodiment includes a service providing unit, a driving load determining unit, a service load determining unit, and a provision controller. The service providing unit provides one or more kinds of services in a vehicle. The driving load determining unit determines a driving load of a driver that is driving the vehicle. The service load determining unit determines a service load that is a load applied on the driver by a service provided by the service providing unit. The provision controller controls provision of the service on the basis of a total value of the driving load and the service load.

7 Claims, 7 Drawing Sheets

FIG.3

| USER | MOVEMENT OF SIGHT LINE | | | INDICATOR OPERATION | STEERING OPERATION | | | ... |
|------|-------|--------|-------|-----------|-------|--------|-------|-----|
|      | LARGE | MIDDLE | SMALL |           | LARGE | MIDDLE | SMALL | ... |
| U1   | 400   | 200    | 0     | 300       | 300   | 150    | 0     | ... |
| U2   | 200   | 100    | 0     | 100       | 100   | 50     | 0     | ... |
| U3   | 300   | 150    | 0     | 200       | 200   | 100    | 0     | ... |
| ⋮    | ⋮     | ⋮      | ⋮     | ⋮         | ⋮     | ⋮      | ⋮     | ⋮   |

FIG.4

| USER | LOAD TOLERANCE |
|------|----------------|
| U1   | 1000           |
| U2   | 1200           |
| U3   | 700            |
| ⋮    | ⋮              |

| SERVICE TYPE | SERVICE ITEM | SERVICE LOAD |
|---|---|---|
| E-MAIL NOTIFICATION SERVICE | NEW INCOMING CALL NOTIFICATION | 100 |
| | READ OUT TEXT | 400 |
| TELEPHONE SERVICE | INCOMING CALL NOTIFICATION | 100 |
| | TALKING | 400 |
| VOICE RETRIEVAL SERVICE | VOICE RETRIEVAL | 400 |
| NAVIGATION SERVICE | ROUTE SETTING | 250 |
| | ROUTE GUIDING | 100 |
| ⋮ | ⋮ | ⋮ |

FIG.7

| RUNNING STATE | STRAIGHT RUNNING | | | TURNING TO RIGHT | | | STRAIGHT RUNNING | |
|---|---|---|---|---|---|---|---|---|
| | POSITION P1 | POSITION P2 | POSITION P3 | POSITION P4 | POSITION P5 | POSITION P6 | POSITION P7 |
| TOTAL LOAD VALUE | LM{ LD | LM{ LS LD | LM{ LD | LM{ LD | LM{ LD, LS | LM{ LS LD | LM{ LD |
| OVERLOAD DETERMINATION | LD≤LM | LD+LS≤LM | LD≤LM | LD≤LM | LD+LS>LM | LD+LS≤LM | LD≤LM |
| TASK TO BE PROCESSING TARGET | — | TASK 1 | — | — | TASK 2 | — | — |
| EXECUTION OF TASK | — | EXECUTION OF TASK 1 | — | — | — | EXECUTION OF TASK 2 | — |
| DISPLAY | 80 81 82 | 80 81 82 83 | 80 81 82 | 80 81 82 | 80 81 82 83 | 80 81 82 83 | 80 81 82 |
| SOUND | — | MESSAGE FROM "XXX" IS RECEIVED. READ OUT? | — | — | — | MESSAGE FROM "YYY" IS RECEIVED. READ OUT? | — |

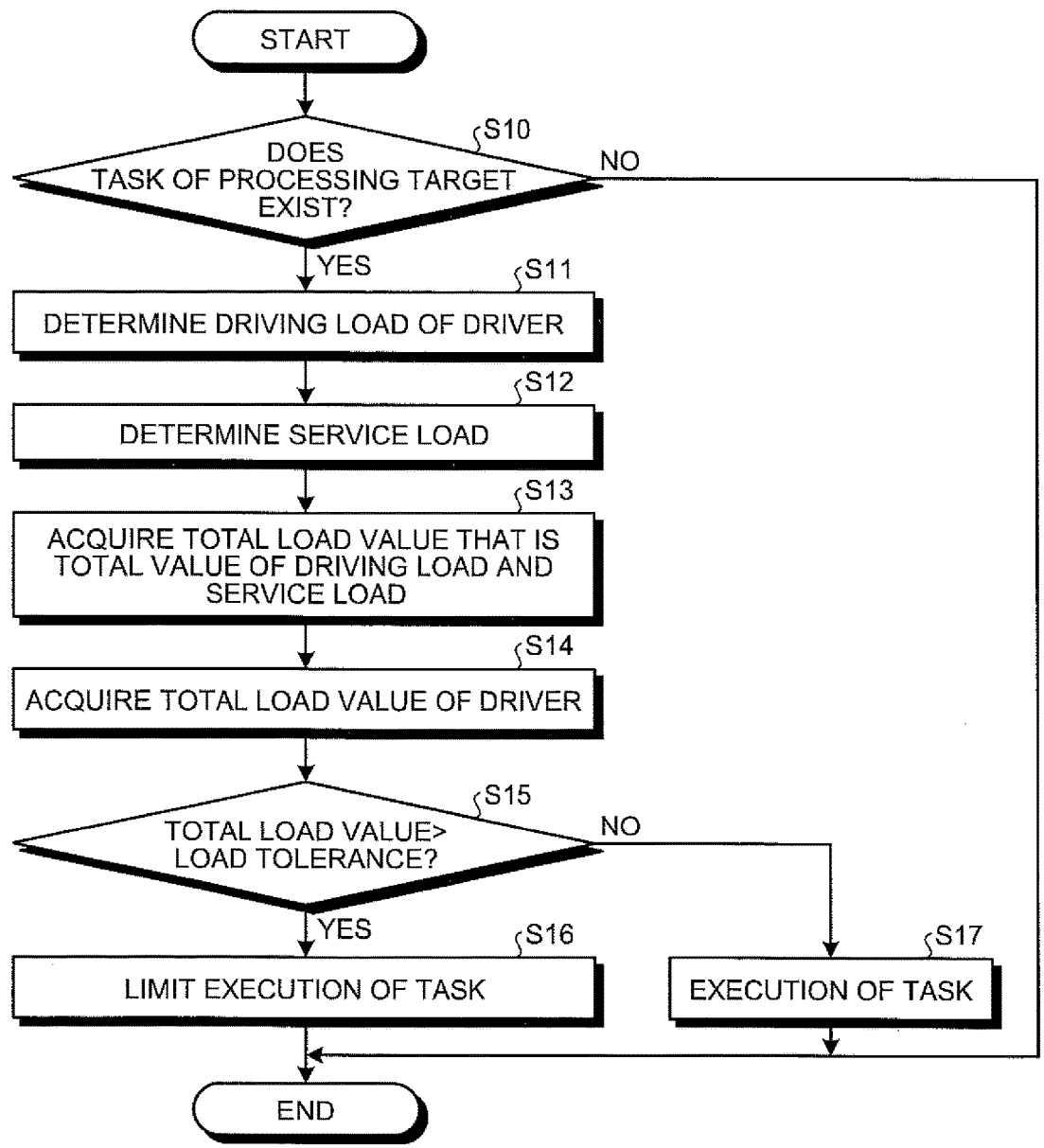

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2016-018398, filed on Feb. 2, 2016, the entire contents of which are incorporated herein by reference.

FIELD

The embodiment discussed herein is directed to an information processing apparatus and an information processing method.

BACKGROUND

Conventionally, there is known an information processing apparatus that provides various kinds of services, such as a telephone service, an e-mail notification service, a navigation service, a traffic information providing service, and a weather information providing service, to an occupant of a vehicle.

A technology is proposed, as a technology for this kind of information processing apparatus, which temporarily stops the provision of information even when real-time delivered information or incoming call information of a cell-phone is received in a case where the driving load of a driver is high, for example, due to a lane change or the like (for example, see Japanese Laid-open Patent Publication No. 2004-070795).

In the case of determining that the driving load is high, the conventional information processing apparatus temporarily stops any information providing services even when real-time delivered information and incoming call information of a cell-phone are received. However, the conventional information processing apparatus does not consider the load for a driver caused by the service, and thus produces fear that provision of the service to the driver is not appropriately performed.

SUMMARY

According to an aspect of an embodiment, an information processing apparatus includes a service providing unit, a driving load determining unit, a service load determining unit, and a provision controller. The service providing unit provides one or more kinds of services in a vehicle. The driving load determining unit determines a driving load of a driver that is driving the vehicle. The service load determining unit determines a service load. The service load is a load applied on the driver by a service provided by the service providing unit. The provision controller controls provision of the service based on a total value of the driving load and the service load.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 is a diagram illustrating one example of driving load information to be stored in a driving load information storage;

FIG. 4 is a diagram illustrating one example of load tolerance information to be stored in a load tolerance information storage illustrated in FIG. 2;

FIG. 7 is a diagram illustrating one example of the task to be the new processing target, an execution timing of the task, contents to be displayed on a display, and sound contents to be output from a speaker;

FIG. 8 is a flowchart illustrating a processing procedure that is executed by a controller of the information processing apparatus.

DESCRIPTION OF EMBODIMENT

Hereinafter, an embodiment of an information processing apparatus and an information processing method according to the present disclosure will be described in detail with reference to accompanying drawings. In addition, it is not intended that the disclosed technology is not limited to the embodiment described below.

1. Information Processing Method

Figure 1A:
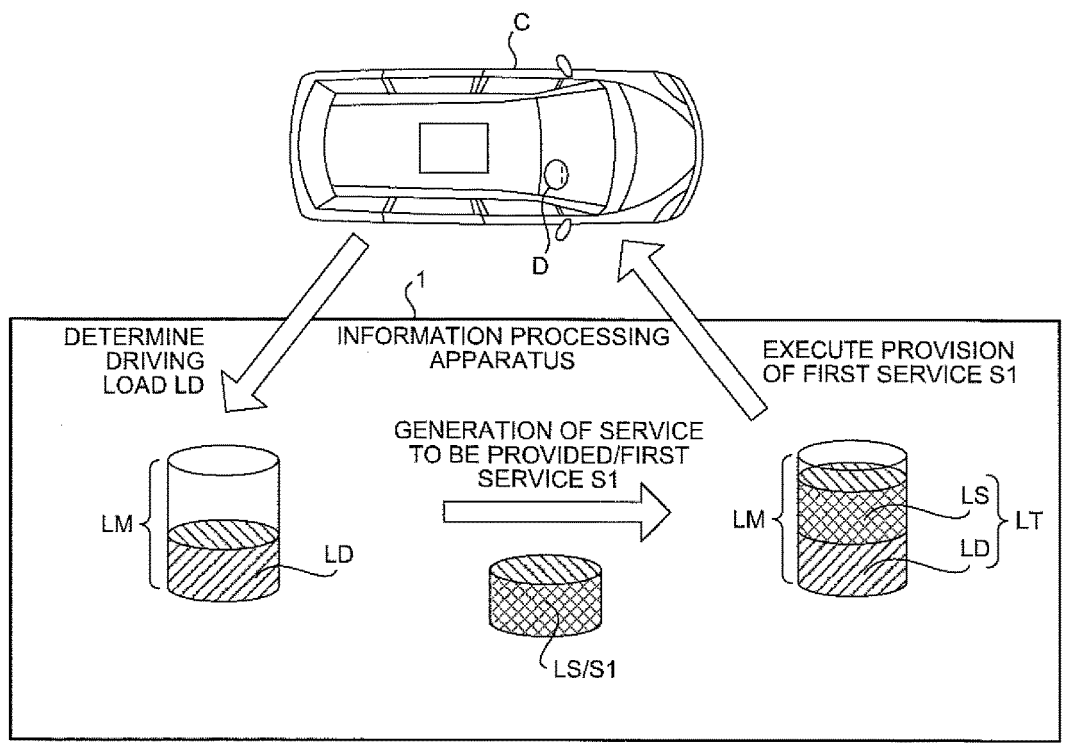
FIGS. 1A and 1B are diagrams illustrating an information processing method according to an embodiment.
Figure 1B:
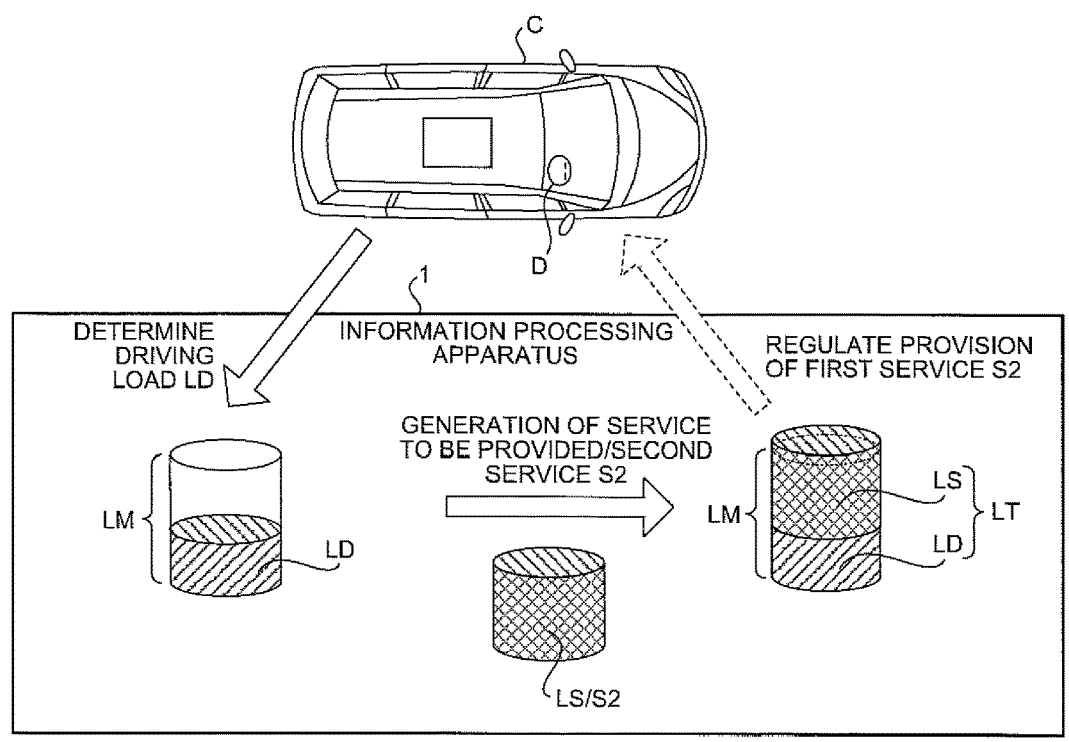

FIGS. 1A and 1B are diagrams illustrating an information processing method according to an embodiment. The information processing method is executed by an information processing apparatus 1.

The information processing apparatus 1 illustrated in FIGS. 1A and 1B includes a service providing unit that can provide a plurality of kinds of services "S" in a vehicle "C". The types of the service "S" to be provided by the information processing apparatus 1 include, for example, a telephone service "Sa", an e-mail notification service "Sb", a navigation service "Sc", a traffic information providing service "Sd", a weather information providing service "Se", a voice retrieval service "Sf", etc. The service "S" is not limited to an information providing service.

The information processing apparatus 1 controls provision of the service "S" on the basis of the load applied on a driver "D" caused by driving of the vehicle "C" (hereinafter, may be referred to as "driving load 'LD'") and the load applied on the driver "D" caused by the service "S" to be provided by the service providing unit (hereinafter, may be referred to as "service load 'LS'").

As illustrated in FIG. 1A, the information processing apparatus 1 according to the embodiment determines the driving load "LD" of the driver "D". The determination of the driving load "LD" is executed on the basis of, for example, the movement of the sight line of the driver "D". For example, the information processing apparatus 1 can determine that the driving load "LD" of the driver "D" is larger as the movement amount of the sight line of the driver "D" is larger. The information processing apparatus 1 can determine that the driving load "LD" of the driver "D" is larger as the time in which the sight line of the driver "D" is directed to a predetermined target (rearview mirror, sideview mirror, etc.) is longer or the frequency thereof is larger.

The information processing apparatus 1 can determine the driving load "LD" of the driver "D" on the basis of at least one of the driving-operation state of the driver "D", the running environment of the vehicle "C", the running state of the vehicle "C", etc. instead of or in addition to the movement of the sight line of the driver "D".

As illustrated in FIG. 1A, in a case where a first service "S1" (for example, traffic information providing service) is generated as a service to be provided, the information processing apparatus 1 determines a service load "LS" that is the load applied on the driver "D" by the first service "S1". The kinds of the service loads "LS" differ from, for example, one type of the service "S" to another.

The information processing apparatus 1 controls provision of the first service "S1" on the basis of the total value (hereinafter, may be referred to as "total load value 'LT'") of the driving load "LD" of the driver "D" and the service load "LS". For example, the information processing apparatus 1 determines whether or not a total load value "LT" exceeds a load tolerance "LM" of the driver "D", and controls the provision of the first service "S1" on the basis of the determination result. In the example illustrated in FIG. 1A, because the total load value "LT" does not exceed the load tolerance "LM", the information processing apparatus 1 provides the first service "S1" to the driver "D".

Subsequently, as illustrated in FIG. 1B, in a case where the second service "S2" (for example, e-mail notification service) is generated as the service "S" to be provided, the service load "LS" is determined, which is the load applied on the driver "D" by the second service "S2". The information processing apparatus 1 controls the provision of the second service "S2" on the basis of the total load value "LT" that is the total value of the driving load "LD" of the driver "D" and the service load "LS".

As illustrated in FIG. 1B, the service load "LS" of the second service "S2" is higher than the service load "LS" of the second service "S1", and the total load value "LT" exceeds the load tolerance "LM" of the driver "D", and thus, the information processing apparatus 1 regulates the provision of the second service "S2" to the driver "D".

The information processing apparatus 1 executes at least one of, for example, stop of the provision of the second service "S2", change of a provision timing of the second service "S2", change of provision contents of the second service "S2", and change of a providing method of the second service "S2" as the regulation of the provision of the second service "S2" to the driver "D".

For example, the information processing apparatus 1 can set the provision timing of the second service "S2" to the timing at which the total load value "LT" becomes lower than the load tolerance "LM". Thereby, the provision of the service "S" in such a state that the total load value "LT" exceeds the load tolerance "LM" of the driver "D" can be suppressed, so that it is possible to execute the provision of the service "S" while suppressing the influence on the driving operation of the driver "D". Thus, the service can be provided to the driver "D" more appropriately.

The information processing apparatus 1 can reduce the provision contents (for example, amount of information to be provided) of the second service "S2" so that the total load value "LT" does not exceed the load tolerance "LM". For example, the information processing apparatus 1 can refrain from providing a part of the e-mail notification service "Sb". Thereby, the provision of the service "S" can be suppressed in such a state that the total load value "LT" exceeds the load tolerance "LM" of the driver "D".

The information processing apparatus 1 can further change the providing method of the second service "S2" so that the total load value "LT" does not exceed the load tolerance "LM". For example, the notification of the e-mail notification service "Sb" can be changed from by the auditory notification to by the visual or tactile notification, and thus, the provision of the service "S" that may exceed the load tolerance "LM" of the driver "D" can be suppressed.

2. Configuration of Information Processing Apparatus

Figure 2:
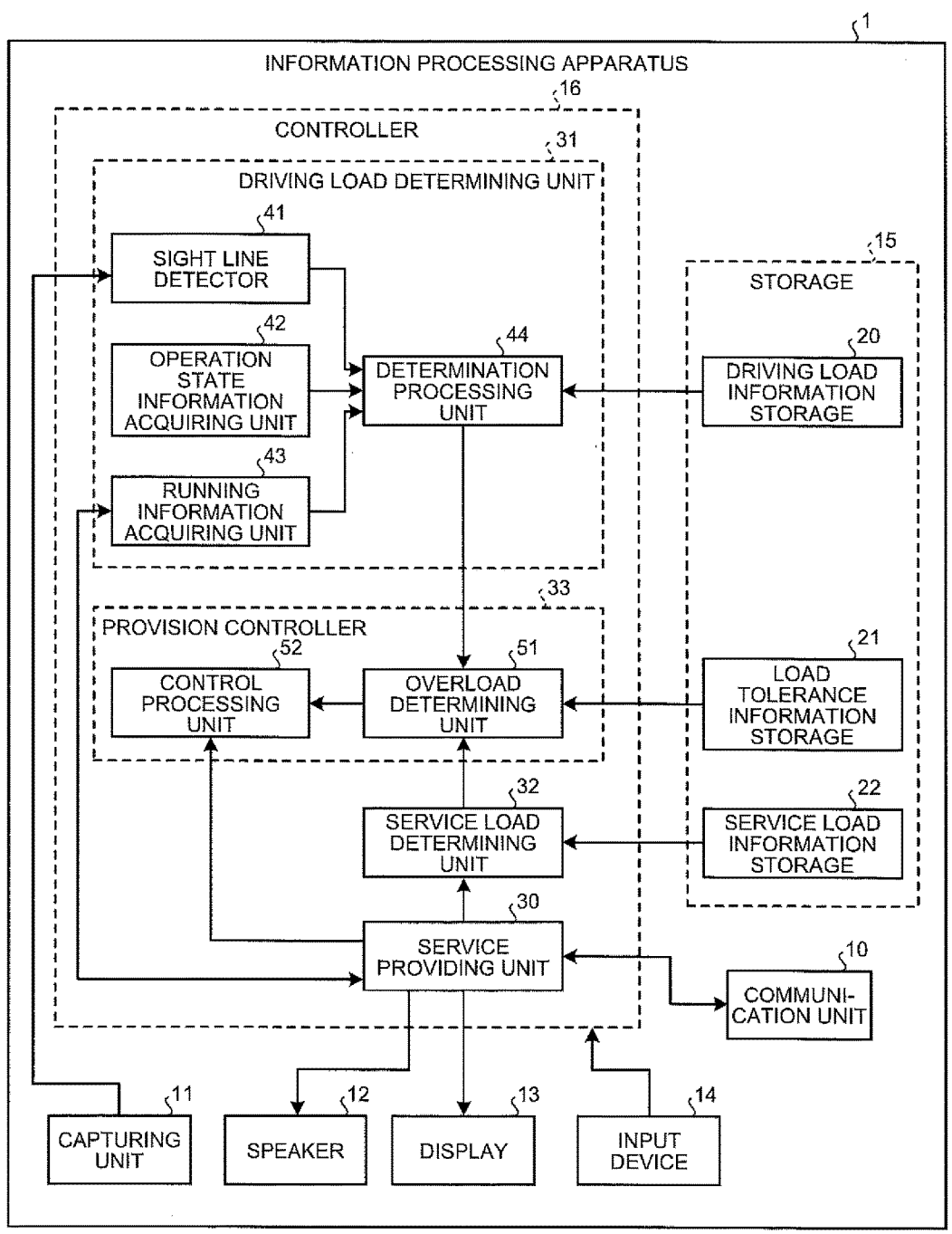
FIG. 2 is a diagram illustrating a configuration example of an information processing apparatus according to the embodiment.

FIG. 2 is a diagram illustrating a configuration example of the information processing apparatus 1 according to the embodiment. The information processing apparatus 1 is, for example, an on-vehicle apparatus that is mounted on the vehicle "C" (see FIGS. 1A and 1B), and can provide various kinds of the services "S" to an occupant of the vehicle "C".

As illustrated in FIG. 2, the information processing apparatus 1 includes a communication unit 10, a capturing unit 11, a speaker 12, a display 13, an input device 14, a storage 15, and a controller 16.

2.1. Communication Unit

The communication unit 10 is a communication interface that is two-way-communicably connected to a wireless communication network. The controller 16 can communicate with an external device via the communication unit 10, and thus, can acquire various kinds of information.

For example, the controller 16 can acquire various kinds of information (for example, map information, retrieval information, weather information, traffic information, e-mail information) from various server devices via the communication unit 10. The controller 16 can connect to a telephone communication network via the communication unit 10, and can provide the telephone service "Sa" thereby.

2.2. Capturing Unit

The capturing unit 11 is a capturing device including, for example, a complementary metal-oxide semiconductor image sensor (CMOS image sensor), and is arranged in the vehicle "C" so that a capturing direction thereof is directed to a driver's seat. The capturing unit 11 captures a region including an eye of the driver "D", and outputs a captured image that is the captured result.

2.3. Speaker

The speaker 12 is arranged in the vehicle "C" so that, for example, an output direction of sound is directed to the driver's seat, and converts a sound signal output from the controller 16 to a sound wave to be output.

2.4. Display

The display 13 is arranged in the vehicle "C" to direct to the driver's seat, and converts an image signal output from the controller 16 to an image to be displayed. The display 13 includes, for example, a Liquid Crystal Display (LCD).

2.5. Input Device

The input device 14 includes, for example, a touch-pad to which information is input by the driver "D", and the controller 16 is notified of the information input to the input device 14. In a case where the display 13 includes a touch-screen display, the display 13 may double as a function of the input device 14.

2.6. Storage

The storage 15 includes a driving load information storage 20, a load tolerance information storage 21, and a service load information storage 22. The storage 15 is realized by a semiconductor memory element such as a Random Access Memory (RAM) and a Flash Memory, or a storing device such as a hard disk and an optical disk.

2.6.1. Driving Load Information Storage

The driving load information storage 20 stores driving load information for determining the driving load "LD" of the driver "D". FIG. 3 is a diagram illustrating one example of the driving load information to be stored in the driving load information storage 20.

As illustrated in FIG. 3, the driving load information is information in which the load corresponding to the movement of each user "U" is associated with the corresponding user "U". The movement of the user "U" includes, for example, the movement of the sight line of the user "U", the indicator operation of the user "U", and the steering operation of the user "U".

Herein, the driving load information illustrated in FIG. 3 is assumed to be stored in the driving load information storage 20, and the driver "D" is assumed to be a user "U1". In this case, "400", "200", and "0" of the load are associated with "large", "middle", and "small" of the movement of the sight line of the user "U1", respectively. Moreover, "300" of the load is associated with the indicator operation and "300", "150", and "0" of the load are associated with "large", "middle", and "small" of the steering operation, respectively.

The driving load information is not limited to the example illustrated in FIG. 3. The driving load information may be, for example, information in which the gas-pedal operation of the user "U", the movement of a head of the user "U", etc. are associated with the load as the movement of the user "U" in addition to or instead of the example illustrated in FIG. 3.

Moreover, the driving load information may include information with which the load corresponding to the running state of the vehicle "C" (velocity, acceleration of vehicle "C") and the running environment of the vehicle "C" (for example, expressway, road including many curves, farm road, road with lots of ups and downs, etc.) is associated. Not limited to a kind of the table illustrated in FIG. 3, the driving load information may store a computing equation that employs various kinds of information on the movement of the sight line of the user "U", the indicator operation of the user "U", the running state of the vehicle "C", the running environment of the vehicle "C", etc. as a parameter.

2.6.2. Load Tolerance Information Storage

The load tolerance information storage 21 stores information (hereinafter, may be referred to as "load tolerance information") in which each user "U" and the corresponding load tolerance "LM" are associated with each other. FIG. 4 is a diagram illustrating one example of the load tolerance information to be stored in the load tolerance information storage 21.

As illustrated in FIG. 4, the load tolerance information is information in which each load tolerance "LM" is associated with the corresponding user "U". In the example illustrated in FIG. 4, "1000" is set as the load tolerance "LM" of the user "U1", "1200" is set as the load tolerance "LM" of a user "U2", and "700" is set as the load tolerance "LM" of a user "U3".

The load tolerance information may be information in which each user "U" is further associated with the corresponding load tolerance whose kinds differ from one time zone to another (daytime and night-time), and/or one weather to another (shiny, cloudy, rainy, snowy, and typhonic). Moreover, the load tolerance information may be information in which the age and/or the gender of the driver "D" and the load tolerance "LM" are associated with each other.

2.6.3. Service Load Information Storage

The service load information storage 22 stores information (hereinafter, may be referred to as "service load information") in which the service load "LS" is associated with the service "S" to be provided to the driver "D" by the controller 16.

Figures 5, 6:
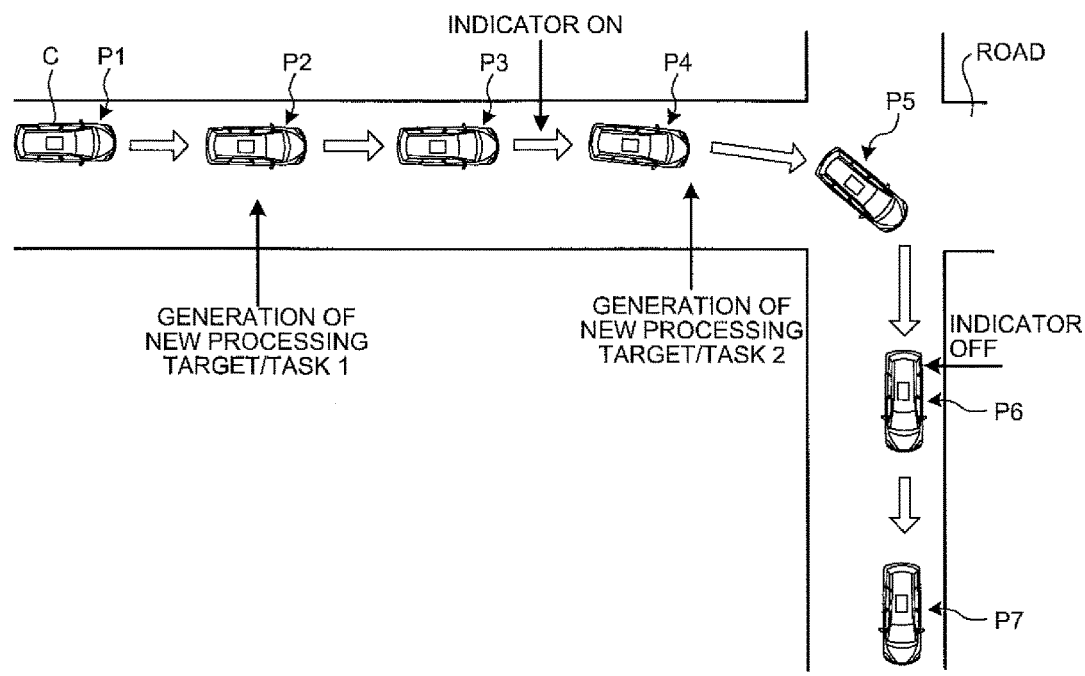
FIG. 5 is a diagram illustrating one example of service load information to be stored in a service load information storage illustrated in FIG. 2.
FIG. 6 is a diagram illustrating one example a relation between change of a running position of a vehicle and a task to be a new processing target.

FIG. 5 is a diagram illustrating one example of service load information to be stored in the service load information storage 22. The service load information illustrated in FIG. 5 is information in which each service load "LS" is associated with the corresponding type and item of the service "S" to be provided to the driver "D" by the controller 16.

In the example illustrated in FIG. 5, each service load "LS" is associated with the corresponding service "S" of the e-mail notification service "Sb", the telephone service "Sa", the voice retrieval service "Sf", the navigation service "Sc", etc.

Moreover, "new incoming call notification" and "read out text" are respectively set in the e-mail notification service "Sb" as service items, and "100" and "400" are respectively set to the service items as the service loads "LS". "Incoming call notification" and "talking" are respectively set in the telephone service "Sa" as service items, and "100" and "400" are respectively set to the service items as the service loads "LS".

Moreover, "voice retrieval" is set in the voice retrieval service "Sf" as a service item, and "400" is set to this service item as the service load "LS". "Route setting" and "route guiding" are respectively set in the navigation service "Sc" as service items, and "250" and "100" are respectively set to the service items as the service loads "LS".

2.7. Controller

As illustrated in FIG. 2, the controller 16 includes a service providing unit 30, a driving load determining unit 31, a service load determining unit 32, and a provision controller 33.

The controller 16 includes, for example, a microcomputer including a Central Processing Unit (CPU), a Read Only Memory (ROM), a RAM, an input/output port, etc. and various circuits. The CPU of the microcomputer reads and executes a program stored in the ROM to realize the control to be mentioned later.

In the controller 16, for example, the aforementioned CPU reads and executes the aforementioned program to realize functions of the service providing unit 30, the driving load determining unit 31, the service load determining unit 32, and the provision controller 33.

Moreover, a part or whole of each of the service providing unit 30, the driving load determining unit 31, the service load determining unit 32, and the provision controller 33 may be constituted of the hardware such as a Application Specific Integrated Circuit (ASIC) and a Field Programmable Gate Array (FPGA).

2.7.1. Service Providing Unit

The service providing unit 30 can provide various kinds of the services "S" such as the telephone service "Sa", the e-mail notification service "Sb", the navigation service "Sc", the traffic information providing service "Sd", the weather information providing service "Se", the voice retrieval service "Sf", and a hazard anticipation notification service "Sg".

The telephone service "Sa" is a service that executes a connection to, for example, a fixed-line telephone communication network and a cell-phone communication network, and includes, for example, the service items of the incoming call notification, the hands-free talking, the voice call, etc.

The incoming call notification is a service for notifying of an arrival of an incoming call. The hands-free talking is a service for providing the talking using a speakerphone and a microphone. The voice call is a service for calling to an instructed target caused by an instruction of a call using voice of the driver "D".

The e-mail notification service "Sb" is a service for executing an input/output of an e-mail. The e-mail notification service "Sb" includes service items such as the incoming call notification and the read out text. The incoming call notification is a service for notifying of the fact that a newly-received e-mail exists. The read out text is a service for notifying of contents of the body text in a newly-received e-mail.

The navigation service "Sc" is a service for setting and guiding of a running route of the vehicle "C". The navigation service "Sc" includes the service items such as the route setting and the route guiding. The route setting is a service for setting a running route of the vehicle "C" performed by the driver "D". The route guiding is a service for guiding a running route set by the driver "D" by using a sound and an image.

The traffic information providing service "Sd" is a service for providing to the driver "D" the traffic information on the periphery of the vehicle "C" and the traffic information on the set running route. The weather information providing service "Se" is a service for providing to the driver "D" the weather information on the periphery of the vehicle "C" and the weather information on the set running route.

The hazard anticipation notification service "Sg" is a service for notifying of a hazard that is to be generated on the driver "D" in the future. The hazard anticipation notification service "Sg" notifies of the fact that, for example, a running-out-prone spot or an accident-prone spot exists on the running route set in the navigation service "Sc".

The service "S" to be provided by the service providing unit 30 is not limited to the aforementioned kinds of services, and may include a service for providing other information to the driver "D" and a service for notifying a passenger other than the driver "D" of the information.

2.7.2. Driving Load Determining Unit

The driving load determining unit 31 determines the driving load "LD" of the driver "D" that drives the vehicle "C". The driving load determining unit 31 can determine the driving load "LD" of the driver "D" on the basis of, for example, a movement of the driver "D".

As illustrated in FIG. 2, the driving load determining unit 31 includes a sight line detector 41, an operation state information acquiring unit 42, a running information acquiring unit 43, and a determination processing unit 44. The sight line detector 41 detects the movement of the sight line of the driver "D" on the basis of information on captured images output from the capturing unit 11.

The operation state information acquiring unit 42 acquires information (hereinafter, may be referred to as "operation state information") on an operation state of the driver "D" for the vehicle "C" from various devices provided in the vehicle "C". For example, the operation state information acquiring unit 42 can acquire, as the operation state information, information on a steering operation, information on a brake operation, information on a gas-pedal operation, information on an indicator operation, information on a wiper operation, information on a headlight operation, information on a hazard light operation, etc.

The running information acquiring unit 43 can acquire information (hereinafter, may be referred to as "running information") on the running environment of the vehicle "C" and the running state of the vehicle "C" from the service providing unit 30. Moreover, the running information acquiring unit 43 can acquire, as the running information, information on the velocity and the acceleration of the vehicle "C" from a measuring instrument provided in the vehicle "C".

The determination processing unit 44 determines the driving load "LD" of the driver "D" on the basis of at least one of the information on the sight line of the driver "D" that is detected by the sight line detector 41, the operation state information acquired by the operation state information acquiring unit 42, and the running information acquired by the running information acquiring unit 43.

The determination processing unit 44 can determine that the movement of the sight line of the driver "D" is one of "large", "middle", and "small" on the basis of, for example, the movement amount of the sight line of the driver "D" and the time or the frequency of being directed to a predetermined target (for example, rearview mirror or sideview mirror) thereof.

For example, in a case where the movement amount of the sight line of the driver "D" is a threshold or more, and the time or the frequency of being directed to a predetermined target thereof is a threshold or more, the determination processing unit 44 determines that the movement of the sight line of the driver "D" is "large". In a case where the movement amount of the sight line of the driver "D" is the threshold or more, or the time or the frequency of being directed to a predetermined target thereof is the threshold or more, the determination processing unit 44 determines that the movement of the sight line of the driver "D" is "middle".

In a case where the movement amount of the sight line of the driver "D" is not the threshold or more, and the time or the frequency of being directed to a predetermined target thereof is not the threshold or more, the determination processing unit 44 determines that the movement of the sight line of the driver "D" is "small". The determining method for determining that the movement of the sight line of the driver "D" is one of "large", "middle", and "small" is not limited to the aforementioned example. Moreover, the degree of the movement of the sight line of the driver "D" is not limited to three steps of "large", "middle", and "small", and may be two steps, or four or more steps.

The determination processing unit 44 can determine that the steering operation is one of "large", "middle", and "small" on the basis of the operation amount of the steering operation per unit time or the operation amount of the steering operation in the same direction. Similarly to the degree of the movement of the sight line, the degree of the steering operation is not limited to three steps of "large", "middle", and "small", and may be two steps or four or more steps.

Herein, the driving load information stored in the driving load information storage 20 is assumed to be in the state illustrated in FIG. 3, and the driver "D" of the vehicle "C" is assumed to be the user "U1". Moreover, it is assumed that the movement of the sight line of the user "U1" is "large", the user "U1" performs the indicator operation, and the steering operation of the user "U1" is "large".

In this case, the load corresponding to the movement of the sight line is "400", the load corresponding to the indicator operation is "300", and the load corresponding to the steering operation is "300". Therefore, the determination processing unit 44 determines that the driving load "LD" of the user "U1" is "1000" on the basis of the driving load information stored in the driving load information storage 20.

The determination processing unit 44 can determine the degree of the brake operation on the basis of the operation amount of the brake operation per unit time and the like. The determination processing unit 44 can acquire the load corresponding to the degree of the brake operation from the driving load information, and can determine the driving load "LD" of the driver "D" including the load.

The determination processing unit 44 can determine the load corresponding to the operation speed or the operation interval of the wiper, and can determine the driving load "LD" of the driver "D" including the load. In this case, the determination processing unit 44 can determine that the degree of the wiper operation is higher as, for example, the operation speed of the wiper is faster or the operation interval of the wiper is shorter.

As described above, the driving load information storage 20 may include, as the driving load information, information with which the loads corresponding to the running state of the vehicle "C" (velocity, acceleration of vehicle "C") and the running environment of the vehicle "C" (for example, expressway, road including many curves, farm road, road with lots of ups and downs, number or positions of other vehicles and pedestrians, etc.) are associated.

In this case, the determination processing unit 44 may determine the load of the driver "D" according to the running environment and the running state of the vehicle "C" on the basis of the running information acquired from the running information acquiring unit 43, and may determine the driving load "LD" of the driver "D" including the determined load. For example, the determination processing unit 44 may determine the driving load "LD" of the driver "D" so that the load is higher as the velocity and the acceleration of the vehicle "C" is larger.

2.7.3. Service Load Determining Unit

The service load determining unit 32 determines the service load "LS" that is the load applied on the driver "D" by the service "S" provided by the service providing unit 30.

In a case where, for example, the service "S" to be provided is generated in the service providing unit 30, the service load determining unit 32 determines the service load "LS" that is the load applied on the driver "D" by the service "S" to be provided, on the basis of the service load information stored in the service load information storage 22.

Herein, the service load information stored in the service load information storage 22 is assumed to be in the state illustrated in FIG. 5, and the driver "D" of the vehicle "C" is assumed to be the user "U1". The service load determining unit 32 is assumed to acquire the information that indicates the type of the service "S" to be provided by the service providing unit 30 (hereinafter, may be referred to as "service type") and the item of the service "S" (hereinafter, may be referred to as "service item") from the service providing unit 30.

In a case where the service type is "e-mail notification service", the service load determining unit 32 determines that the service load "LS" is "100" when the service item is "new incoming call notification", and determines that the service load "LS" is "400" when the service item is "read out text".

In a case where the service type is "telephone service", the service load determining unit 32 determines that the service load "LS" is "100" when the service item is "incoming call notification", and determines that the service load "LS" is "400" when the service item is "talking".

The service load information stored in the service load information storage 22 may be the information in which each load whose kind differs from one user to another is associated with the corresponding service "S" to be stored. In other words, the service load information may be information in which the information on the service "S" (service type and service item) of each user and the information on the service load "LS" of the corresponding user are associated with each other.

In this case, the service load determining unit 32 determines the service load "LS" on the basis of the information on the user "U" (for example, in a case where user "U1" is current driver "D", information on the service load "LS" corresponding to user "U1") corresponding to the current driver "D" in the service load information stored in the service load information storage 22.

Thereby, the service load "LS" according to the driver "D" can be determined more accurately. For example, the service load determining unit 32 can specify the current driver "D" on the basis of the captured images output from the capturing unit 11, and can specify the current driver "D" on the basis of authentication information {for example, user IDentification (user ID), password, etc.} that is input to the input device 14.

The service load "LS" is not limited to be associated with the service type and the service item as illustrated in FIG. 5, and may be associated only with the service type. Moreover, the service load "LS" may be changed in accordance with the service provision time (for example, time when driver "D" is notified of information) and the service provision amount.

For example, the service load determining unit 32 may set the service load "LS" to be higher as the service provision time is longer even for the same service. Moreover, the service load determining unit 32 may set the service load "LS" to be higher in accordance with the service provision time during the provision of the service "S". Thereby, the service load "LS" of the service "S" whose service provision time is long can be set high.

2.7.4. Provision Controller

The provision controller 33 controls the provision of the service "S" executed by the service providing unit 30 on the basis of the total load value "LT" that is the total value of the driving load "LD" of the driver "D" determined by the driving load determining unit 31 and the service load "LS" determined by the service load determining unit 32.

The provision controller 33 includes an overload determining unit 51 and a control processing unit 52. The overload determining unit 51 computes the total load value "LT" that is the total value of the driving load "LD" of the driver "D" and the service load "LS" determined by the service load determining unit 32.

The overload determining unit 51 acquires the load tolerance "LM" of the driver "D" from the load tolerance information storage 21. For example, in a case where the load tolerance information stored in the load tolerance information storage 21 is in the state illustrated in FIG. 4 and the user "U1" is the driver "D", the overload determining unit 51 determines that the load tolerance "LM" is "1000". In a case where the user "U3" the driver "D", the overload determining unit 51 determines that the load tolerance "LM" is "700".

The overload determining unit 51 can specify the current driver "D" on the basis of, for example, the captured images output from the capturing unit 11, or can specify the current driver "D" on the basis of the authentication information (for example, user ID, password, etc.) input to the input device 14.

The overload determining unit 51 determines whether or not the total load value "LT" of the driver "D" exceeds the load tolerance "LM" of the driver "D". For example, in a case where the load tolerance information stored in the load tolerance information storage 21 is in the state illustrated in FIG. 4 and the user "U1" is the driver "D", the overload determining unit 51 determines whether or not the total load value "LT" that is the total of the driving load "LD" of the user "U1" and the service load "LS" exceeds "1000".

When determining that the total load value "LT" of the driver "D" does not exceed the load tolerance "LM" of the driver "D", the control processing unit 52 controls the service providing unit 30 to cause the service providing unit 30 to execute the task of the service "S" to be provided. Thereby, the service "S" is provided from the service providing unit 30 to the driver "D".

When determining the total load value "LT" of the driver "D" exceeds the load tolerance "LM" of the driver "D", the control processing unit 52 controls the service providing unit 30 to regulate the provision of the service "S" executed by the service providing unit 30. The control processing unit 52 executes, for example, at least one of stop of the provision of the service "S", change of the provision timing of the service "S", limitation of the provision contents of the service "S", and change of the providing method of the service "S", so that it is possible to regulate the provision of the service "S" executed by the service providing unit 30.

For example, in a case where the driving load "LD" of the driver "D" becomes high and the total load value "LT" of the driver "D" exceeds the load tolerance "LM" of the driver "D" during the provision of the service "S" executed by the service providing unit 30, the control processing unit 52 performs a service stopping request to the service providing unit 30. Thereby, the service "S" provided from the service providing unit 30 is stopped.

Subsequently, in a case where the total load value "LT" of the driver "D" becomes lower than the load tolerance "LM" of the driver "D", the control processing unit 52 performs a service resuming request to the service providing unit 30. Thereby, execution of the task of the service "S" that is in a stopped state caused by the service providing unit 30 is resumed. In a case where the service resuming request is performed, the service providing unit 30 may execute the provision of the stopped provision of the service "S" from the beginning thereof.

When the service "S" to be provided is generated in the service providing unit 30 in a state where the total load value "LT" of the driver "D" exceeds the load tolerance "LM" of the driver "D" the control processing unit 52 can perform a service stopping request to the service providing unit 30. Thereby, start of the provision of the service "S" to the driver "D" in the state where the total load value "LT" of the driver "D" exceeds the load tolerance "LM" of the driver "D" can be suppressed.

Subsequently, in a case where the total load value "LT" of the driver "D" becomes lower than the load tolerance "LM" of the driver "D", the control processing unit 52 performs a service starting request to the service providing unit 30. Thereby, the service "S" provided from the service providing unit 30 is caused to start. Thus, the control processing unit 52 changes the provision timing of the service "S", so that it is possible to execute the provision of the service "S" while suppressing the influence on the driving operation of the driver "D".

The control processing unit 52 can perform the service resuming request and the service starting request to the service providing unit 30 at the timing when the total load value "LT" of the driver "D" becomes lower than the load tolerance "LM" of the driver "D" by a predetermined value or more, or at the timing when the state where the total load value "LT" is lower than the load tolerance "LM" in such a manner continues for a predetermined period. Thereby, in such a case that the total load value "LT" of the driver "D" fluctuates around the load tolerance "LM" of the driver "D", repeated execution of the stop and the resume of the service "S" can be suppressed.

The control processing unit 52 can limit the provision contents the service "S" so that the total load value "LT" of the driver "D" does not exceed the load tolerance "LM" of the driver "D". For example, in a case where the new incoming call notification and the read out text are sequentially executed to provide the e-mail notification service "Sb", the control processing unit 52 can execute, for example, only the new incoming call notification so that the total load value "LT" of the driver "D" does not exceed the load tolerance "LM" of the driver "D".

In a case where the incoming call notification and the talking connection are executed to provide the telephone service "Sa", the control processing unit 52 can execute only the incoming call notification so that the total load value "LT" of the driver "D" does not exceed the load tolerance "LM" of the driver "D".

For example, in a case where the service "S" is provided by using both of the speaker 12 and the display 13, the control processing unit 52 can control the service providing unit 30 to provide the service "S" by using one of the speaker 12 and the display 13 so that the total load value "LT" of the driver "D" does not exceed the load tolerance "LM" of the driver "D". Thus, the load of the driver "D" can also be reduced by changing the providing method of the service "S". Thereby, the provision of the service "S" can be executed while suppressing the influence on the driving operation of the driver "D".

For example, in a case where the total load value "LT" of the driver "ID" becomes lower than the load tolerance "LM" of the driver "D" even when the limitation of the provision contents of the service "S" or the change of the providing method of the service "S" is executed, the control processing unit 52 may execute stop of the provision of the service "S" or change of the provision timing.

Herein, one example of an information process executed by the controller 16 will be specifically explained with reference to FIGS. 6 and 7. FIG. 6 is a diagram illustrating one example a relation between change of a running position of a vehicle "C" and a task to be a new processing target.

As illustrated in FIG. 6, it is assumed that the running position of the vehicle "C" sequentially changes positions "P1", "P2", "P3", "P4", "P5", "P6", and "P7", and the service "S" to be processed is generated at each of the positions "P2" and "P4". Moreover, it is assumed that the driver "D" turns an indicator "ON" for a right turn while the vehicle "C" moves from the position "P3" to the position "P4", subsequently, the indicator is turned "OFF" when the vehicle "C" is at the position "P6".

In this case, the controller 16 controls an execution timing of the task, display contents of the display 13, and sound contents output from the speaker 12, for example, as illustrated in FIG. 7. FIG. 7 is a diagram illustrating one example a relation between a task to be a new processing target, an execution timing of the task, contents to be displayed on the display 13, and sound contents to be output from a speaker 12.

For example, in a case where the position of the vehicle "C" is the position "P1", a task (task of service "S" to be provided) of the processing target do not exist, and the controller 16 displays an image 82 that indicates a state of the driving load "LD" of the driver "D" on a display screen 80 of the display 13. The display screen 80 illustrated in FIG. 7 displays a map image 81 that includes the position where the vehicle "C" is presently running, and the image 82 is arranged on the map image 81.

In a case where the position of the vehicle "C" moves to the position "P2", the task "1" is decided to be a task of a new processing target. In this case, because the total load value "LT" (=driving load "LD"+service load "LS") does not exceed the load tolerance "LM", the controller 16 executes the task "1" without limitation thereof. Thereby, the service "S" to be executed in the task "1" is provided to the driver "D".

The service "S" provided by the task "1" is, for example, the e-mail notification service "Sb", and the controller 16 causes the speaker 12 to output sound, for example, "A message from "XXX" is received. Read out?" The controller 16 displays on the display screen 80 of the display 13 the image 82 that indicates the state of the driving load "LD" of the driver "D" as well as an image 83 that indicates the receipt of a newly-arrived e-mail.

Subsequently, if the driver "D" turns the indicator "ON" to turn to the right, the driving load "LD" becomes high, the total load value "LT" exceeds the load tolerance "LM". In this state, because a task "2" is decided to be a new processing target, the controller 16 does not execute the task "2". Thereby, the provision of the service "S" to be executed in the task "2" to the driver "D" is limited.

The driving load "LD" becomes low at the position "P6" where the turning to the right is terminated, and thus, the total load value "LT" is the load tolerance "LM" or less. Then, the controller 16 starts to execute the task "2". The service "S" performed by the task "2" is, for example, the e-mail notification service "Sb", and the controller 16 causes the speaker 12 to output the sound, for example, "A message from "YYY" is received. Read out?" Thereby, the service "S" to be executed in the task "2" is provided to the driver "D".

3. Process of Information Processing Apparatus

Next, processes executed by the controller 16 of the information processing apparatus 1 will be explained with reference to FIG. 8. FIG. 8 is a flowchart illustrating a processing procedure that is executed by the controller 16 of the information processing apparatus 1, and the processing procedure is executed repeatedly by the controller 16.

As illustrated in FIG. 8, the controller 16 determines whether or not the service "S" to be provided exists, in other words, whether or not the task of the processing target exists (Step S10). In a case where the task of the processing target is determined to exist (Step S10: Yes), the controller 16 determines the driving load "LD" of the driver "D" (Step S11), and further determines the service load "LS" that is the load applied on the driver "D" by the service "S" corresponding to the task of the processing target (Step S12).

Next, the controller 16 computes the total load value "LT" that is the total value of the driving load "LD" and the service load "LS" (Step S13), and further acquires the load tolerance "LM" of the driver "D" from the storage 15 (Step S14). The controller 16 determines whether or not the total load value "LT" exceeds the load tolerance "LM" (Step S15).

In a case where the total load value "LT" is determined to exceed the load tolerance "LM" (Step S15: Yes), the controller 16 limits the execution of the task to limit the provision of the service "S" corresponding to the task of the processing target (Step S16). In the process, the controller 16 executes at least one of, for example, stop of the execution of the task, change of the execution timing of the task (for example, delay), and change of the execution contents of the task (execution of a part of task), so that it is possible to limit the execution of the task.

On the other hand, in a case where the total load value "LT" is determined not to exceed the load tolerance "LM" (Step S15: No), the controller 16 executes the task to provide the service "S" corresponding to the task of the processing target (Step S17).

In a case where the task of the processing target is determined not to exist in Step S10 (Step S10: No), in a case where the process of Step S16 is terminated, or in a case where the process of Step S17 is terminated, the controller 16 terminates the processes illustrated in FIG. 8.

4. Modification

In the aforementioned embodiment, the controller 16 of the information processing apparatus 1 executes the provision of the service MS" so that the total load value "LT" does not exceed the load tolerance "LM", however is not limited thereto.

For example, even in a case where the total load value "LT" exceeds the load tolerance "LM" during the provision of the service "S", the controller 16 may keep on executing the service "S", if the remaining time of the service "S" to be provided is a predetermined time or less.

Even in a case where the total load value "LT" exceeds the load tolerance "LM" during the provision of the service "S", the controller 16 may also stop the provision of the service "S", if the total load value "LT" exceeds the load tolerance "LM" by a predetermined value or more.

In a case where a plurality of the services "S" to be provided is generated simultaneously, the controller 16 sequentially provides the services "S", and the order of the provision thereof may be decided on the basis of the total load value "LT". For example, in a case where the services "S" to be provided are the first service "S1" and the second service "S2", the controller 16 computes the total load value "LT" that is the total value of the service load "LS" of the second service "S1" and the driving load "LD", and the total load value "LT" that is the total value of the service load "LS" of the second service "S2" and the driving load "LD". The controller 16 may preferentially provide the service "S" whose total load value "LT" is higher. The controller 16 may preferentially provide the service "S" whose total load value "LT" is lower.

In a case where a plurality of the services "S" are continuously provided, the controller 16 may reduce the load tolerance "LM" at each time of the provision of the service "S". Thereby, continuation of the state in high load of the driver "D" can be suppressed, so that it is possible to execute the provision of the service "S" while suppressing the influence on the driving operation of the driver "D".

The controller 16 may determine the different service loads "LS" even in a case where the same service "S" is provided. For example, the controller 16 may analyze the service "S" to be provided, and may decide the service load "LS" in accordance with the analyzed result. For example, in a case where the service "S" to be provided is the e-mail notification service "Sb", the controller 16 may execute the morphological analysis on the body text of the received e-mail to extract feature words, and may determine the load of the driver "D" on the basis of the feature words to decide as the service load "LS". Thereby, for example, in a case of an e-mail that notifies of an urgent request and the like, the service load "LS" can be set high.

5. Hardware Configuration

Figure 9:
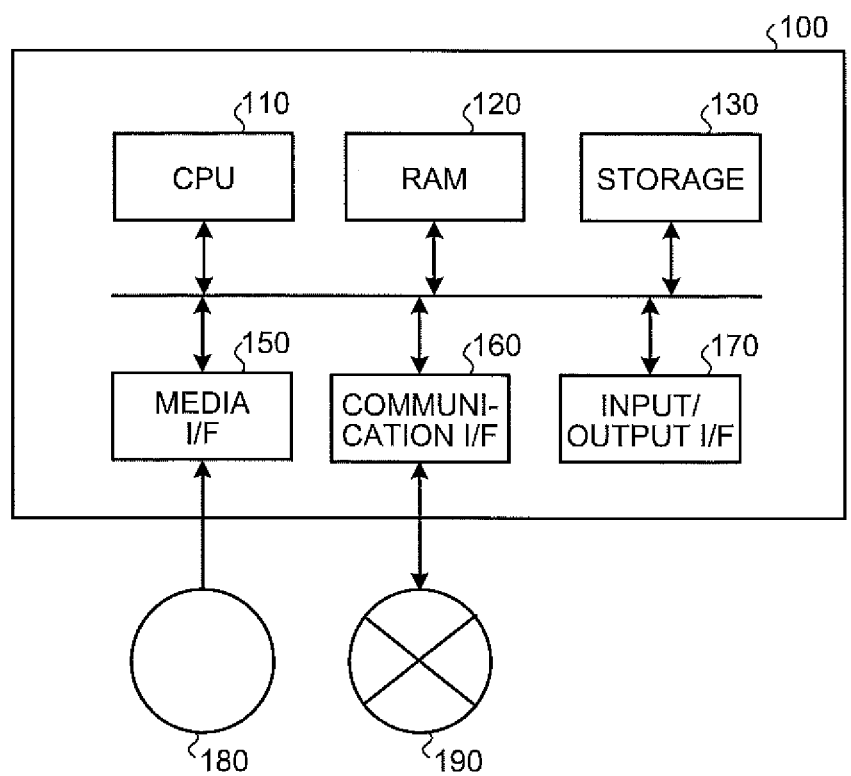
FIG. 9 is a hardware configuration diagram illustrating one example of a computer that realizes functions of the information processing apparatus.

The information processing apparatus 1 according to the present embodiment can be realized by using a computer 100 of the configuration illustrated in FIG. 9 as an example. FIG. 9 is a hardware configuration diagram illustrating one example of a computer that realizes functions of the information processing apparatus 1.

The computer 100 includes a CPU 110, a RAM 120, a storage 130, a media interface (I/F) 150, a communication interface (I/F) 160, and an input/output interface (I/F) 170. The storage 130 stores, for example, a boot program that is executed by the CPU 110 at the start-up of the computer 100, a program depending on the hardware of the computer 100, data to be used by the program, etc. The storage 130 corresponds to the storage 15 (see FIG. 2).

The media I/F 150 reads the program and the data, which are stored in a storing medium 180, to provide to the CPU 110 via the RAM 120. The CPU 110 loads the program on the RAM 120 from the storing medium 180 via the media I/F 150, and executes the loaded program. Or, the CPU 110 executes the program by using the data. The storing medium 180 includes, for example, a magneto-optical recording medium such as a Digital Versatile Disc (DVD), a Secure Digital card (SD card), a Universal Serial Bus memory (USB memory), etc.

The communication I/F 160 corresponding to the communication unit 10 (see FIG. 2) receives data from another device via a network 190 to send to the CPU 110, and sends the data generated by the CPU 110 to another device via the network 190. The CPU 110 is connected to the capturing unit 11, the speaker 12, the display 13, and the input device 14 (not illustrated) via the input/output I/F 170.

The CPU 110 executes the programs loaded on the RAM 120 to realize functions of the service providing unit 30, the driving load determining unit 31, the service load determining unit 32, and the provision controller 33. For example, the CPU 110 reads these programs from the storing medium 180 to execute. However, as another example, the CPU 110 may acquire these programs from another device via the network 190.

6. Effects and Others

As described above, the information processing apparatus 1 according to the embodiment includes the service providing unit 30, the driving load determining unit 31, the service load determining unit 32, and the provision controller 33. The service providing unit 30 provides one or more kinds of the services "S" in the vehicle "C". The driving load determining unit 31 determines the driving load "LD" of the driver "D" driving the vehicle "C". The service load determining unit 32 determines the service load "LS" that is the load applied on the driver "D" by the service "S" provided by the service providing unit 30. The provision controller 33 controls the provision of the service "S" provided by the service providing unit 30 on the basis of the total load value "LT" that is the total value of the driving load "LD" and the service load "LS". Thereby, because the driving load "LD" of the driver "D" as well as the load applied on the driver "D" caused by the provision of the service "S" can be considered, it is possible to execute the provision of the service "S" while suppressing the influence on the driving operation of the driver "D". Therefore, the service can be provided to the driver "D" more appropriately. In other words, because the amount of the influence to be given to a driver differs from one content of the service to be provided to another content, the determination of whether or not the total value of the driving load of the driver and the service load that is based on the contents of the service exceeds the load tolerance improves safety of the drive during the provision of the service to a driver in driving.

The provision controller 33 includes the overload determining unit 51 and the control processing unit 52. The overload determining unit 51 determines whether or not the total load value "LT" exceeds the load tolerance "LM". In a case where the total load value "LT" is determined to exceed the load tolerance "LM" by the overload determining unit 51, the control processing unit 52 regulates the provision of the service "S" to be provided by the service providing unit 30. Thereby, the provision of the service "S" in such a state that the total load value "LT" exceeds the load tolerance "LM" of the driver "D" can be suppressed, so that it is possible to execute the provision of the service "S" while suppressing the influence on the driving operation of the driver "D".

The control processing unit 52 executes at least one of the stop of provision of the service "S", the change of the provision timing of the service "S", and change of the provision contents the service "S" to regulate the provision of the service "S" to be provided by the service providing unit 30. Thereby, the influence on the driving operation of the driver "D" can be suppressed, and thus, the service can be provided to the driver "D" more appropriately. For example, in a case where the total load value "LT" exceeds the load tolerance "LM" during the provision of the service "S", the provision of the service "S" can be stopped, and in a case where the total load value "LT" exceeds the load tolerance "LM" before the provision of service, the provision timing of the service "S" can be changed (for example, delay).

The information processing apparatus 1 includes the load tolerance information storage 21 (one example of threshold storage) that preliminary stores the load tolerance "LM" of each user "U". The overload determining unit 51 acquires the load tolerance "LM" of the user "U" corresponding to the driver "D" from the load tolerance information storage 21, and determines whether or not the total load value "LT" exceeds the acquired load tolerance "LM". Thereby, the load tolerance "LM" can be set in accordance with each driver "D", it is possible to execute the provision of the service "S" while suppressing the influence on the driving operation of the driver "D" even in a case where the driver "D" changes.

The information processing apparatus 1 includes the service load information storage 22 (one example of load information storage) that stores the information on the service "S" to be provided by the service providing unit 30 and the information on the service load "LS" while preliminary associating them with each other. The service load determining unit 32 determines the service load "LS" applied on the driver "D" on the basis of the information stored in the service load information storage 22. Thereby, the service load "LS" can be easily determined, and thus, the provision of the service "S" can be executed rapidly.

The service load information storage 22 stores the information on the service "S" to be provided by the service providing unit 30 and the information on the service load "LS" while associating them with each other for each user "U". The service load determining unit 32 determines the service load "LS" applied on the driver "D" on the basis of the information on the user "U" corresponding to the driver "D", which is stored in the service load information storage 22. Thereby, the service load "LS" according to the driver "D" can be appropriately determined.

The driving load determining unit 31 includes the sight line detector 41 and the determination processing unit 44. The sight line detector 41 detects the movement of the sight line of the driver "D". The determination processing unit 44 determines the driving load "LD" of the driver "D" on the basis of the movement of the sight line of the driver "D" detected by the sight line detector 41. Thus, the information processing apparatus 1 determines the driving load "LD" of the driver "D" by using the movement of the sight line of the driver "D", therefore, the driving load "LD" of the driver "D" can be easily determined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising for use with a vehicle, the information processing apparatus comprising:
    a processor programmed to:
        provide one or more kinds of services in the vehicle;
        determine a driving load of a driver that is driving the vehicle;
        determine a service load, the service load being a load applied on the driver by one of the provided services;
        determine whether or not a total value of the driving load and the service load exceeds a load tolerance of the driver, and
        regulate the provision of the service in a case where the total value is determined to exceed the load tolerance of the driver.

2. The information processing apparatus according to claim 1, wherein the processor is further programmed to regulate provision of the service by executing at least one of stopping the provision of the service, changing a provision timing of the service, and changing a provision content of the service.

3. The information processing apparatus according to claim 1, further comprising
    a threshold memory that preliminary stores a load tolerance of each user, the threshold memory being operatively coupled to the processor, wherein
    the processor is further programmed to acquire a load tolerance of a user among the users corresponding to the driver from the threshold memory, and determine whether or not the acquired load tolerance exceeds the total value.

4. The information processing apparatus according to claim 1, further comprising
    a load information memory that preliminary stores information on the service and information on the service load in association with each other, the load information memory being operatively coupled to the processor, wherein
    the processor is further programmed to determine the service load applied on the driver based on the information stored in the load information memory.

5. The information processing apparatus according to claim 4, wherein
    the load information memory preliminary stores, for each user, information on the service and information on the service load in association with each other, and
    the processor is further programmed to determine the service load applied on the driver based on the information on a user that corresponds to the driver from a plurality of users, which is stored in the load information memory.

6. The information processing apparatus according to claim 1, wherein the processor is further programmed to:
    detect a movement of a sight line of the driver; and
    determine the driving load based on the detected movement of the sight line of the driver.

7. An information processing method for use with a vehicle, the information processing method comprising:
    determining a driving load of a driver that is driving the vehicle;
    determining a service load applied on the driver by a service provided in the vehicle;
    determining whether or not a total value of the driving load and the service load exceeds a load tolerance of the driver, and
    regulating the provision of the service in a case where the total value is determined to exceed the load tolerance of the driver.

* * * * *